(12) United States Patent
Kiger

(10) Patent No.: US 6,295,906 B1
(45) Date of Patent: Oct. 2, 2001

(54) APPARATUS AND METHOD FOR ADVANCING, CUTTING AND EJECTING A TUBULAR WORKPIECE

(75) Inventor: Terry Kiger, Kettering, OH (US)

(73) Assignee: Production Tube Cutting, Inc., Dayton, OH (US)

( * ) Notice: Subject to any disclaimer, the term of this patent is extended or adjusted under 35 U.S.C. 154(b) by 0 days.

(21) Appl. No.: 09/492,574

(22) Filed: Jan. 27, 2000

(51) Int. Cl.[7] ............................... B26D 5/38; B26D 7/02; B26D 7/18
(52) U.S. Cl. ............................ 83/23; 83/54; 83/76.8; 83/80; 83/111; 83/182; 83/277; 83/364; 83/365; 83/367; 83/370; 83/409; 83/412; 83/437.1; 83/452
(58) Field of Search ........................ 83/23, 54, 76.6, 83/80, 76.8, 109, 76.9, 111, 182, 183, 202, 203, 209–212, 241, 250, 268, 364, 365, 367, 369, 370, 372, 409, 412, 419, 437.3, 452, 694, 277, 72, 437.1

(56) References Cited

U.S. PATENT DOCUMENTS

| | | | |
|---|---|---|---|
| 2,540,166 | 2/1951 | Frank et al. . | |
| 2,837,156 | * 6/1958 | Brehm | 83/111 X |
| 3,552,254 | * 1/1971 | Marczy | 83/461 |
| 3,803,966 | 4/1974 | Plegat . | |
| 3,805,654 | 4/1974 | Plegat . | |
| 3,808,923 | 5/1974 | Plegat . | |
| 4,082,022 | * 4/1978 | Horn et al. | 83/212 X |
| 4,205,569 | 6/1980 | Horn et al. . | |
| 4,370,140 | * 1/1983 | Fegley et al. | 493/289 |
| 4,524,656 | * 6/1985 | Del Fabro et al. | 83/23 |
| 4,724,733 | 2/1988 | Suarez et al. . | |
| 4,807,502 | 2/1989 | Clark et al. . | |
| 4,942,796 | * 7/1990 | Dom et al. | 83/72 |
| 5,406,870 | 4/1995 | Suitts et al. . | |
| 5,582,538 | 12/1996 | Hillestad . | |
| 6,123,000 | * 9/2000 | Borzym | 83/54 |

* cited by examiner

*Primary Examiner*—Boyer D. Ashley

(57) ABSTRACT

The present invention is a method for advancing and cutting tube blanks into desired lengths and ejecting the unusable piece of tubing remaining after all of the usable cuts have been made. The machine for cutting the tubes of the present invention is preferably a standard supported shear type cutting machine and the ejection of the tube is accomplished via a pusher that is mounted for reciprocation on a carriage such that when the last piece of usable tubing has been cut from the tube blank the pusher may be activated to eject the tubing from the cutting machine.

11 Claims, 9 Drawing Sheets

APPARATUS AND METHOD FOR ADVANCING, CUTTING AND EJECTING A TUBULAR WORKPIECE

BACKGROUND OF THE INVENTION

This invention relates to the field of specification tube cutting machinery and methods used to produce tubes and tubular pieces from longer stock tubes and, more particularly, to an apparatus and method for advancing and cutting a long tube and ejecting the remaining scrap tube from the cutting machine after the last specified piece is cut, thereby increasing the efficiency of the cutting operation and eliminating a time consuming and dangerous work step from the tube cutting process. In particular, the invention provides a gripper for securely holding the tube during the cutting operation. The gripper is attached to a carriage which is horizontally translatable with respect to the cutting apparatus. Additionally, a pusher is provided for automatically ejecting the last piece of cut tubing from the machine. The pusher is mounted on the carriage and reciprocates forward once the last specified piece of tubing has been cut in order to eject the end piece of tubing from the cutting machine. Preferably the tube cutting machine described herein is used in combination with a shear cutting device, although other methods of cutting tubing are known and would be considered operable in the present invention.

Methods for cutting long tubular stock into pieces of specified length are known. For example, in U.S. Pat. No. 2,837,156 to Brehm a conventional machine for cutting continuously advancing tubing is disclosed. This method, known as the Brehm method, is an example of a cutting method that is useful with the invention disclosed herein. In brief, the Brehm method involves the use of two dies, an inner die for contacting the inner surface of the tubing to be cut and an outer die for contacting the outer surface of the tubing to be cut. In order to cut the tubing, one die (generally the outer die) is moved with respect to the other die thereby "shearing" the tubing. This method for cutting tubing is preferred over other prior art methods that involve "sawing" the tubing because very little of the tubing is destroyed. Furthermore, the use of the Brehm method creates tube ends that are generally smooth and burr free.

Over the years, there have been many attempts to improve on the Brehm method in order to improve the quality and efficiency of the cutting process. For example, U.S. Pat. No. 4,205,569 to Horn et al. discloses a tube cutting apparatus using the Brehm method wherein multiple tube segments may be cut in a single shearing operation. After the tubing is cut, the slices of cut tubing are advanced onto an ejector rod that is then retracted to allow the cut tubing to fall into a collection bin. Additionally, the Horn et al. patent discloses dies that define inclined planes in order to cut tubes on a bias.

Similarly, U.S. Pat. No. 5,406,870 to Suitts et al. also discloses an improvement to the basic Brehm method in which the loader and feeder mechanisms for the cutting machine are integrated into one piece of equipment. In particular, in the Suitts et al. patent, a method and apparatus for cutting tubing is disclosed using the shear cutting method wherein the tubing is fed automatically to the cutter and is gripped and advanced to the cutting station. The cut tube is advanced along an arbor and is dropped off into a bin at the end of the arbor. The cutting machine of the Suitts et al. patent is equipped with an infrared sensing system that works in conjunction with computer programming to discard the scrap materials separately from the specification milled tubing without the need for a mechanical stop finger to determine the tube cutoff length.

Thus, while several prior art methods exist for continuously loading and cutting tubing while discarding any scrap created thereby, these methods tend to be complex and expensive, requiring the use of infrared sensing equipment, etc. Additionally, they also require the use of an arbor that extends past the end of the die and various forms of expensive and elaborate equipment add ons.

Accordingly, there exists a need for a method and apparatus for cutting tubing and automatically ejecting any leftover scrap tubing after all of the usable tubing has been cut that is mechanically simple and relatively inexpensive to fabricate and operate and which does not require the use of overly expensive or elaborate equipment to implement.

SUMMARY OF THE INVENTION

The present invention is an improved method and apparatus for advancing and cutting tube blanks into desired lengths and ejecting the unusable piece of tubing remaining after all of the usable cuts have been made. The machine for cutting the tubes of the present invention is preferably a standard supported shear type cutting machine.

In a preferred embodiment, the present invention consists of a cutting machine, such as a supported shear type cutting machine, for cutting a tubular workpiece and a base upon which the cutting machine is mounted. A carriage is mounted either on the base, or in close proximity thereto, in a manner that allows the carriage independent movement with respect to the base. The carriage is operatively connected to a motor, preferably a stepper motor, so that the carriage may be automatically moved precise distances during the cutting process. The carriage is also equipped with a device, such as grippers, for securing and advancing the tubular workpiece with the carriage. A pusher, shaped to engage the end of the tubular workpiece, is mounted on the carriage for reciprocal movement with respect to the carriage. The pusher includes a sensor, such as a contact switch, positioned on a portion of the carriage so that the position of the pusher with respect to the carriage may be ascertained at at least one point along the reciprocation route of the pusher.

The tube advancer, cutter, ejector of the present invention is preferably operated by selecting a tubular workpiece to be cut and positioning the workpiece on a cradle in the base in alignment with the cutter. After the cutting machine is programmed to make cuts at the desired lengths, the machine is activated. The carriage then begins to travel forward, thereby contacting the pusher with the back end of the tubular workpiece. The contact of the pusher with the tubular workpiece causes relative rearward movement of the pusher with respect to the carriage while the carriage continues to move forward. During this time the grippers, in an open position, continue to move with the carriage in a position coaxial with the tubular workpiece. Then, after the grippers have traveled a predefined distance down the length of the workpiece whereby they can securely grip and advance the workpiece, a sensor is activated sending a signal to activate the grippers to grip the tube and stop the pusher from further relative rearward movement with respect to the carriage. This signal can be sent via an infrared sensor or the like, but preferably is activated by a contact on the back of the pusher.

The carriage continues forward, now with the workpiece secured thereto, a designated cutting length and stopped. This length can be controlled using a stepper motor, various sensors, or other methods known in the art. The cutting machine is activated to make the desired cut and the carriage is moved again the designated length and the desired cut is made. This process continues until all of the desired lengths of tube have been cut from the tubular workpiece. The controller for the carriage, having calculated the number of cuts that have been made, then deactivates the grippers, thereby releasing hold of the remaining scrap piece of the tubular workpiece. The opening of the grippers signals the pusher to stroke forward, thereby ejecting the remaining piece of the workpiece through the cutting machine. The carriage then cycles back to the rear end of the base and is reset to cut another workpiece.

Accordingly, it is an object of the present invention to provide a tube advancer, cutter, ejector for cutting tubes of desired lengths from tubular workpieces which is mechanically simple and relatively inexpensive to fabricate and operate and which does not require the use of overly expensive or elaborate equipment to implement.

Other objects and advantages of the present invention will be apparent from the following description, the accompanying drawings and the appended claims.

DETAILED DESCRIPTION

Figure 1:
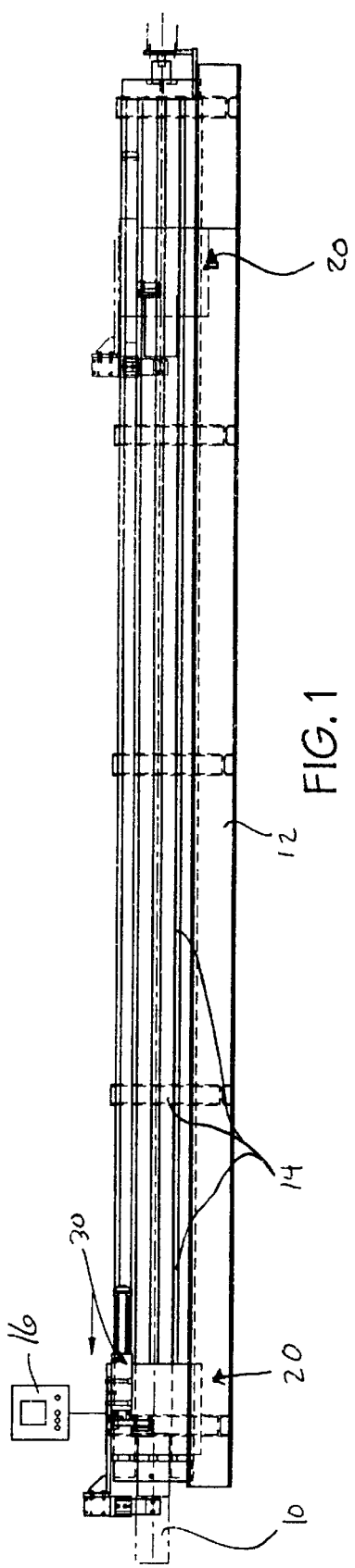
FIG. 1 is a side elevational view of a preferred embodiment of the tube advancer, cutter, ejector of the present invention.
Figure 2:
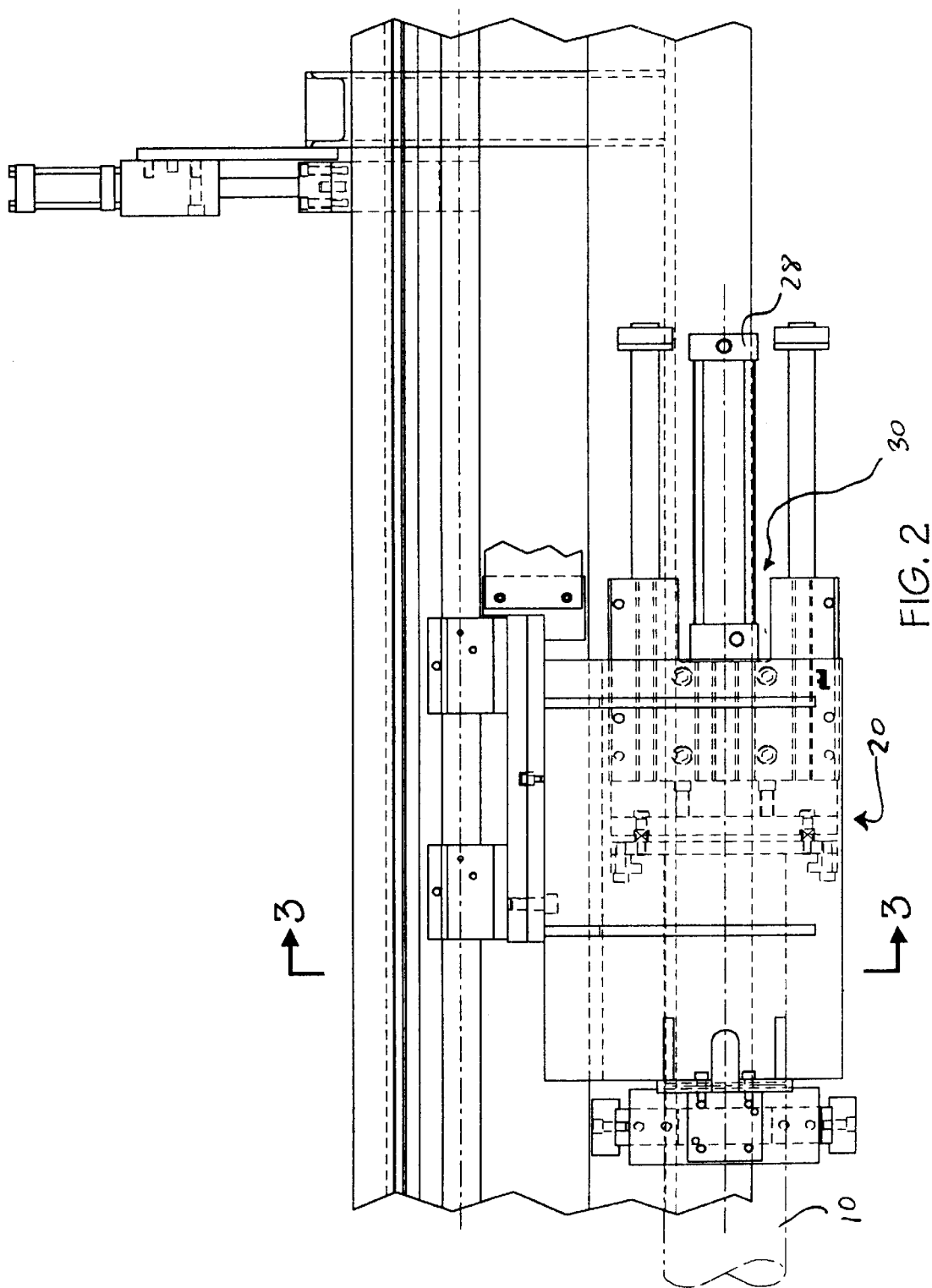
FIG. 2 is a detail top plan view of the carriage in the tube advancer, cutter, ejector of FIG. 1.
Figure 3:
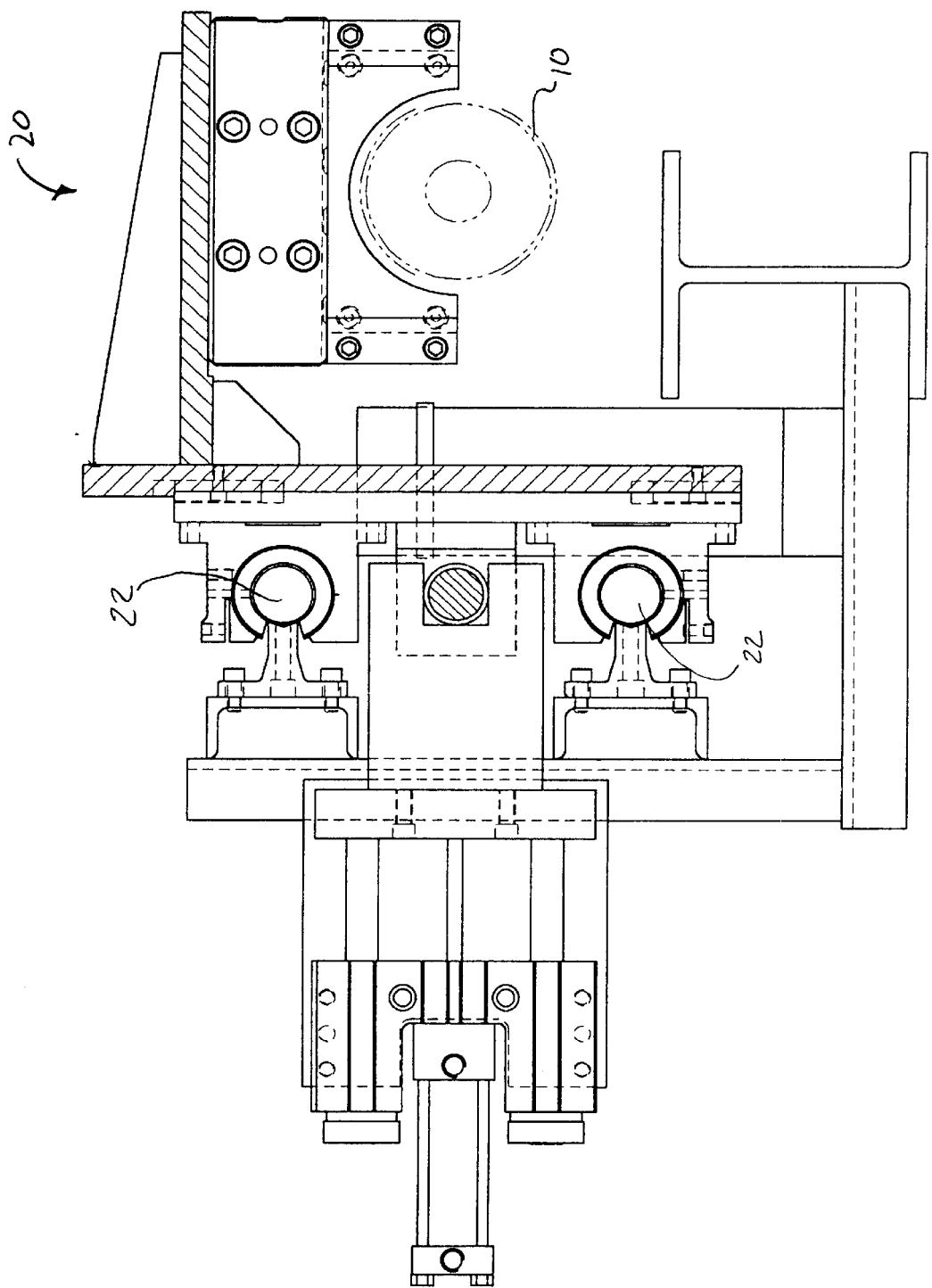
FIG. 3 is a cut away side elevational view of the carriage taken along line 3—3 of FIG. 2.
Figure 4:
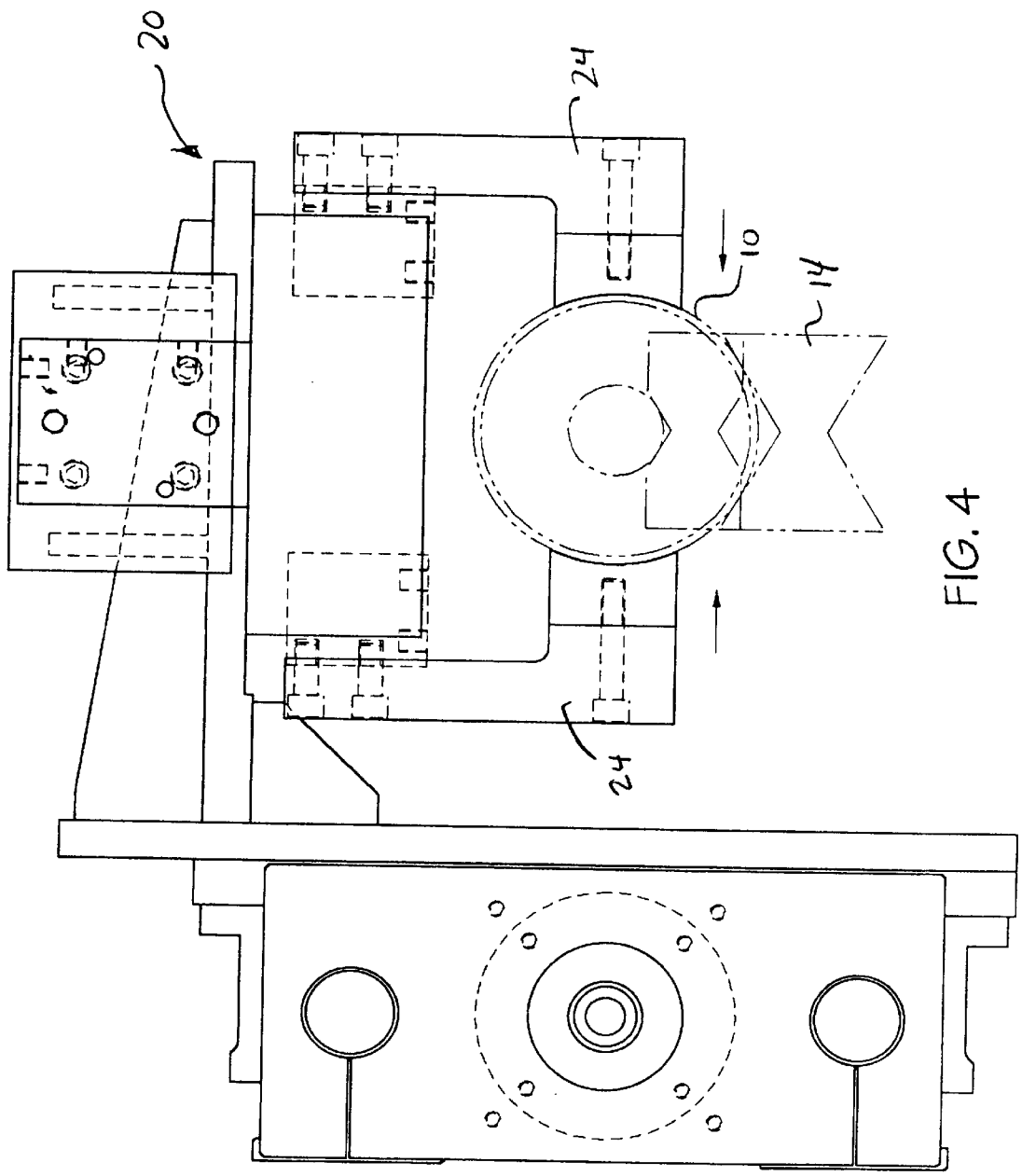
FIG. 4 is a side elevational view of the carriage of FIG. 2 showing the activation of the grippers for securely holding a tubular workpiece.
Figure 5:
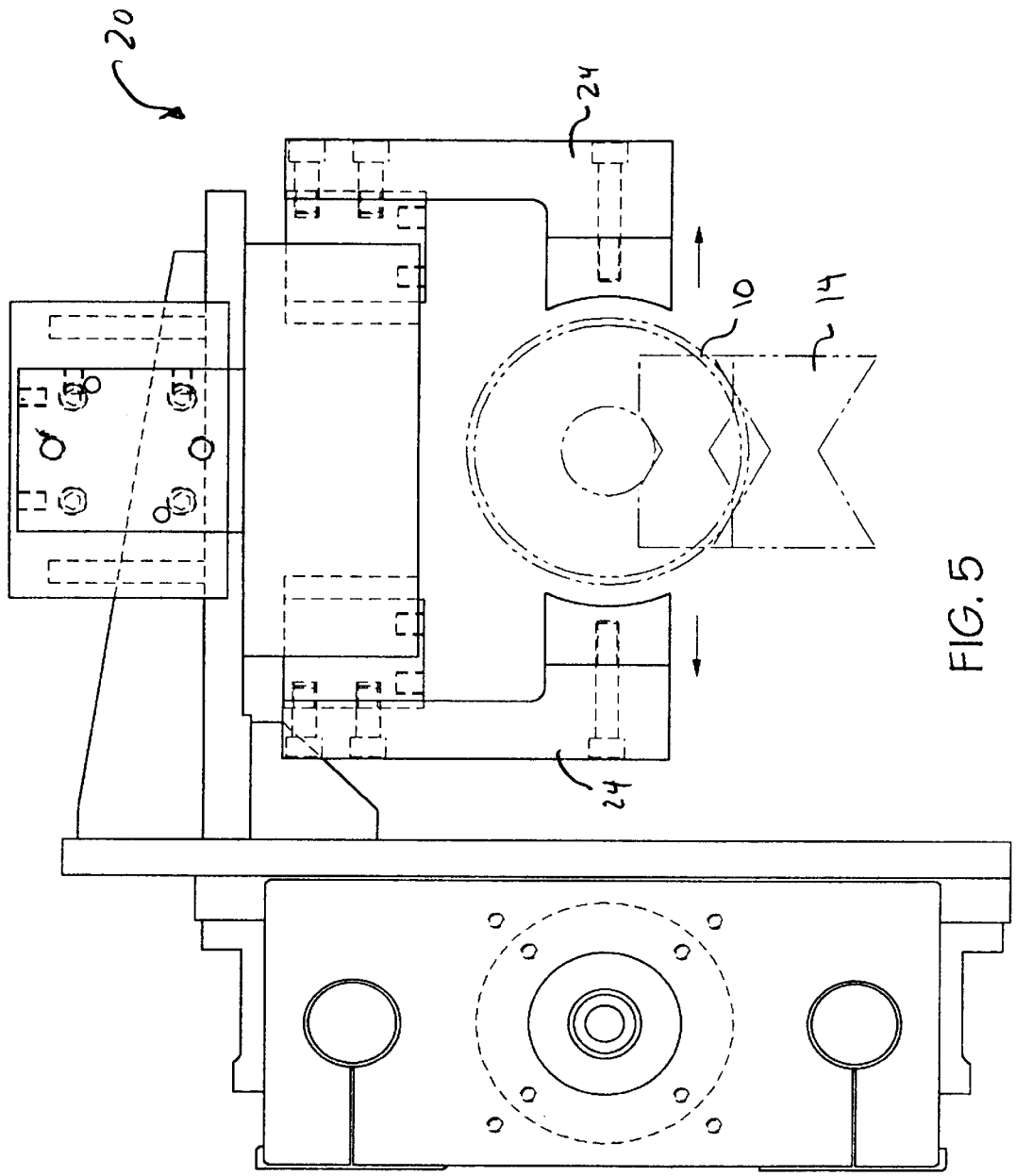
FIG. 5 is a side elevational view of the carriage of FIG. 4 showing the deactivization of the grippers for releasing the tubular workpiece.
Figure 6:
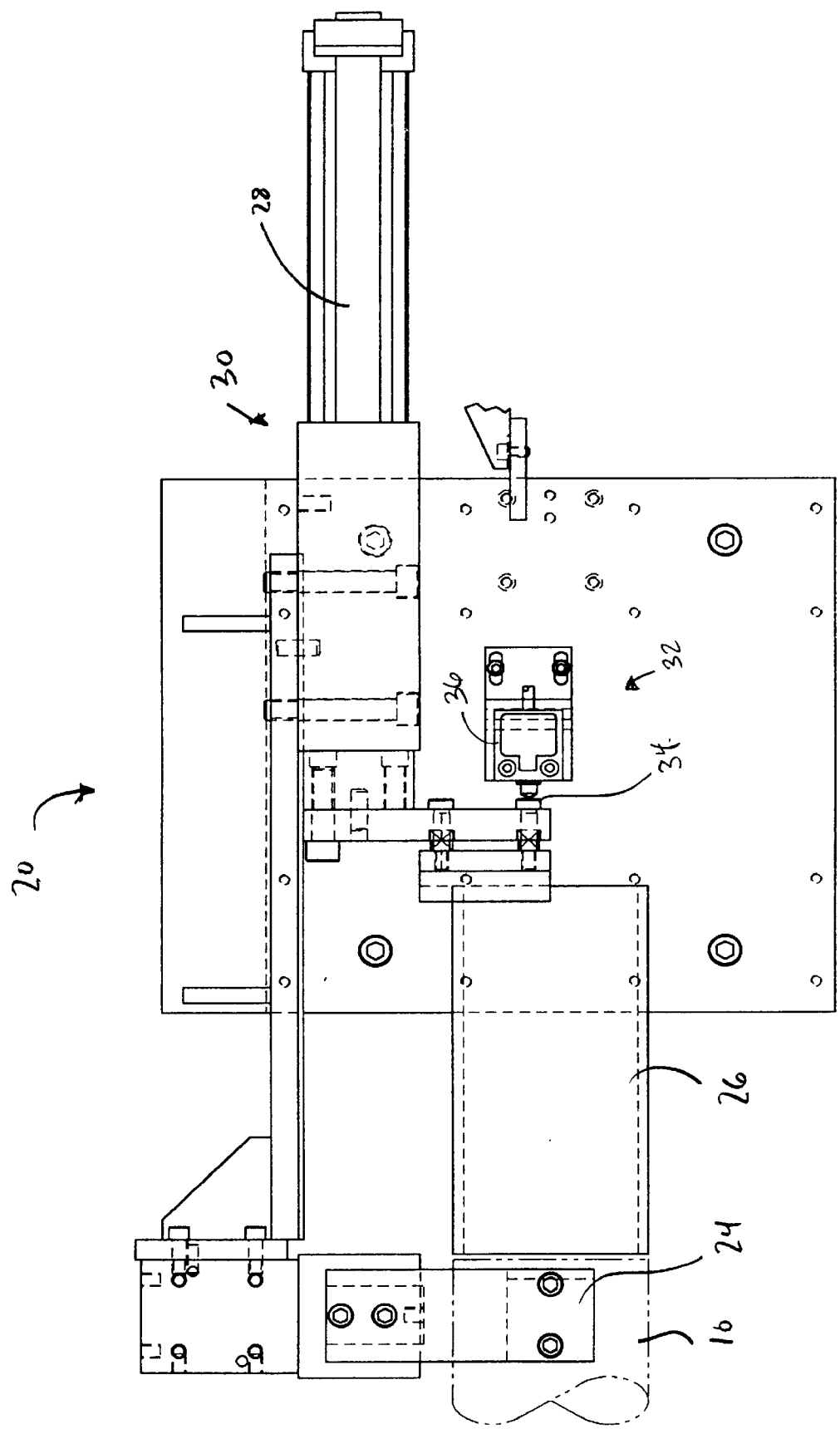
FIG. 6 is a detail side elevation view of the carriage/pusher assembly for use with the tube advancer, cutter, ejector of FIG. 1 showing the pusher in a fully retracted position.
Figure 7:
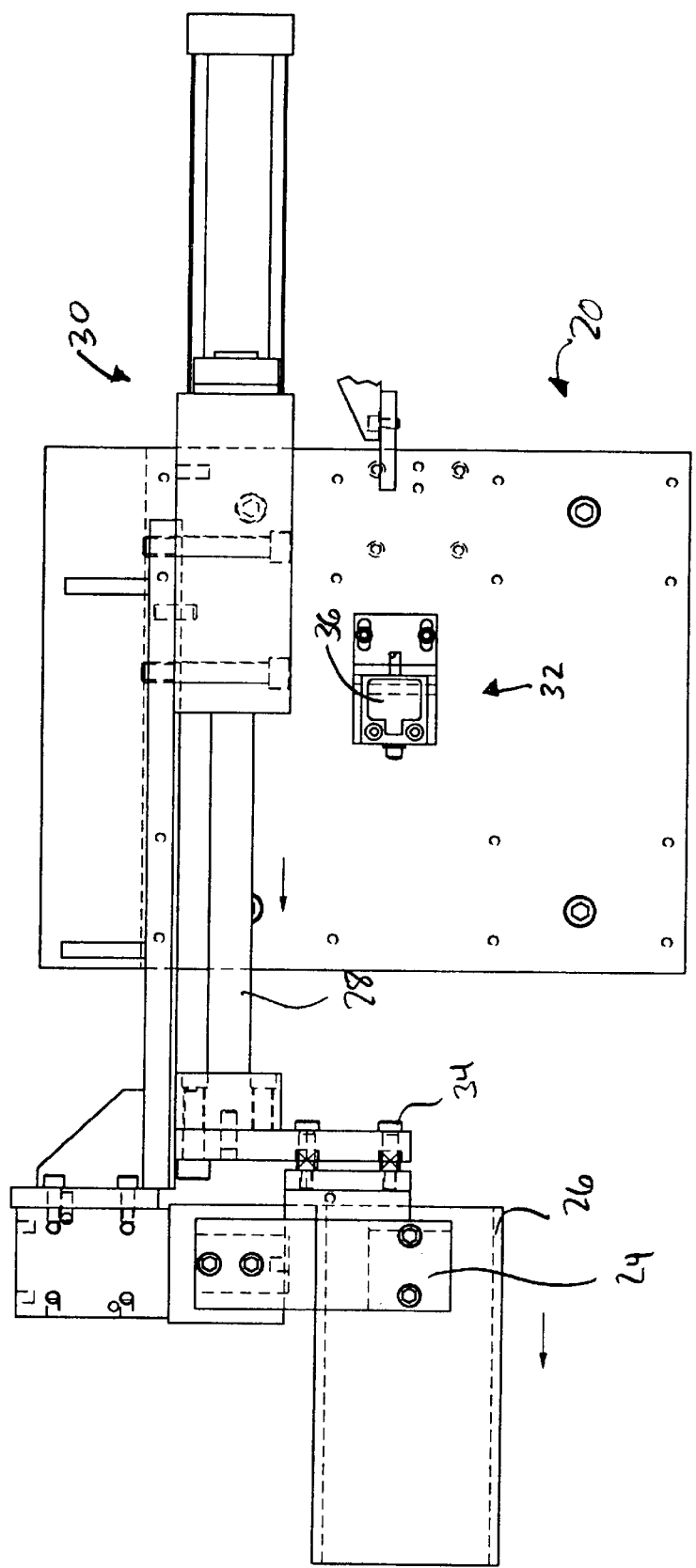
FIG. 7 is a detail side elevation view of the carriage/pusher assembly of FIG. 6 shown in a tube ejecting position.
Figure 8:
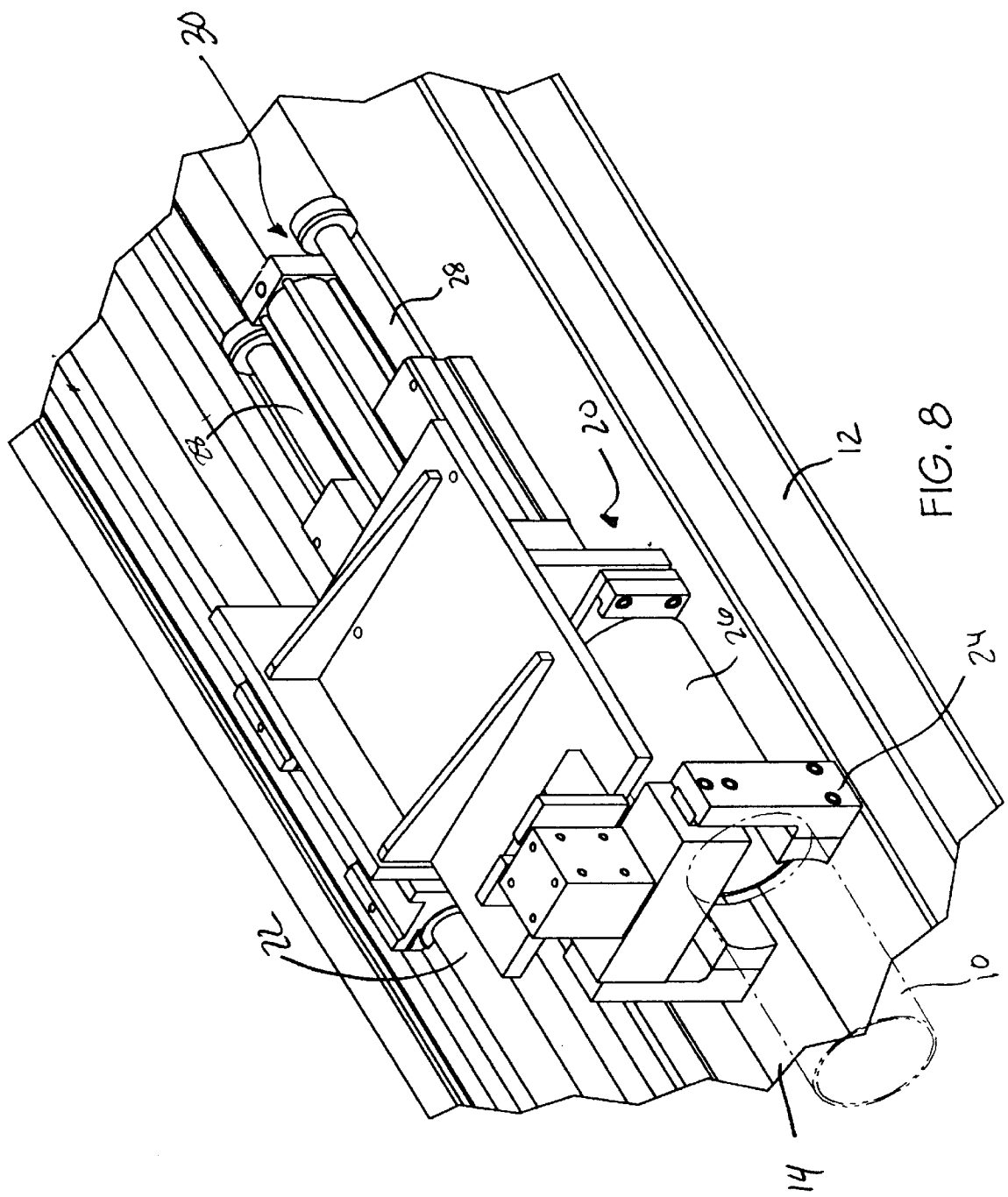
FIG. 8 is a side perspective view of the carriage/pusher assembly of FIG. 6.
Figure 9:
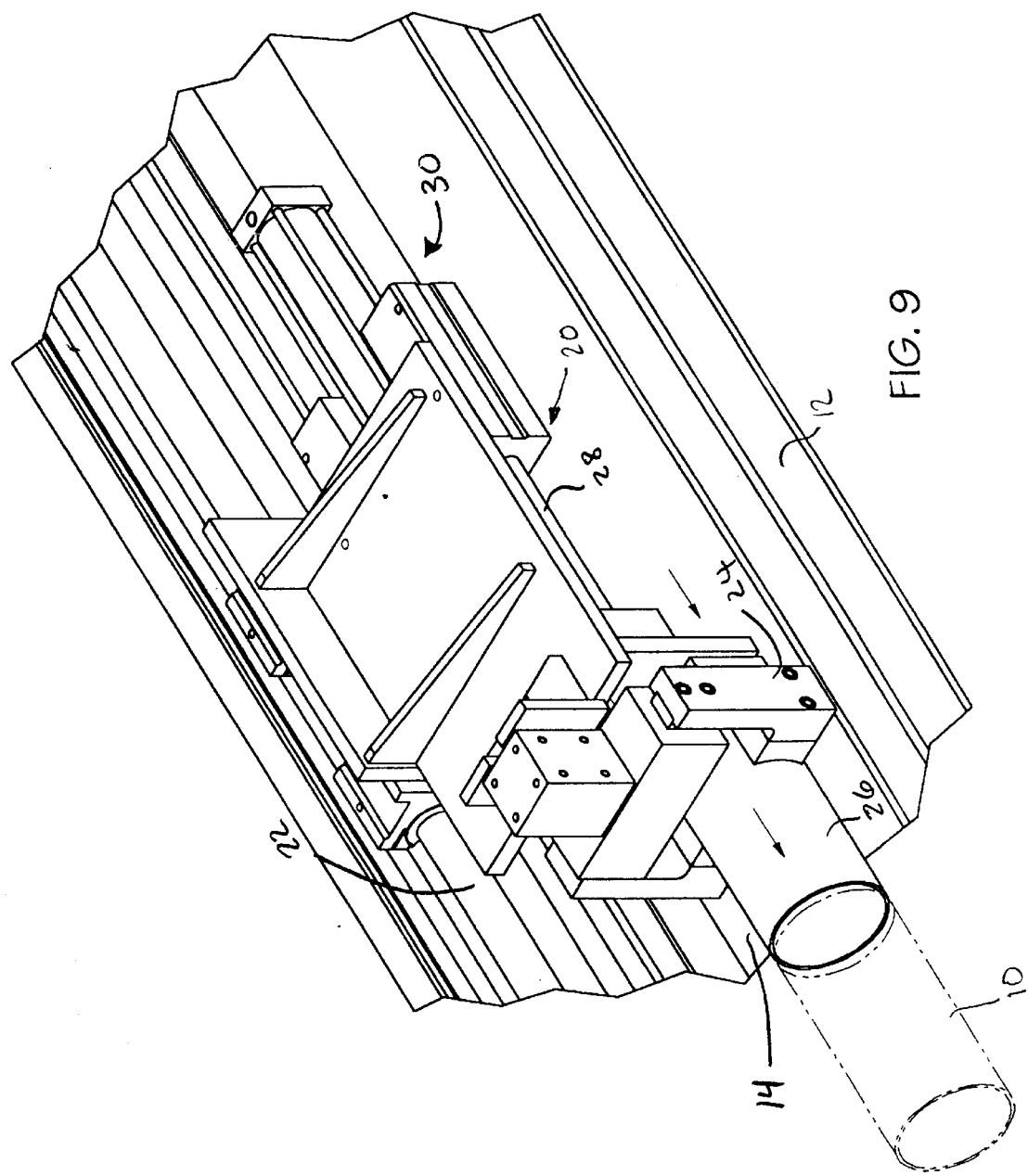
FIG. 9 is a side perspective view of the carriage/pusher assembly of FIG. 7.

In accordance with a preferred embodiment of the present invention, as shown best in FIG. 1, the present invention consists of a cutting machine (not shown), such as a supported shear type cutting machine, for cutting a tubular workpiece 10 into tubes of desired lengths. The cutting machine includes a base 12 upon which the cutting machine is mounted having a cradle 14 for holding the tubular workpiece 10 during the cutting process and a control panel 16 for controlling operation of the cutting machine, and a carriage 20. The carriage 20 is mounted either on the base 12, or in close proximity thereto, in a manner that allows the carriage 20 independent movement with respect to the base 12. As best shown in FIG. 3, the carriage 20 is preferably mounted on a track or rail system 22 so that the carriage 20 may be moved longitudinally with respect to the base 12. The carriage 20 is operatively connected to a motor (not shown), preferably a stepper motor, so that the carriage 20 may be automatically moved precise distances during the cutting process.

The carriage 20 includes a device for securing and advancing the tubular workpiece 10 with the carriage 20 towards the cutting machine. As best shown in FIGS. 4–9, in a preferred embodiment, the device is a pair of grippers 24 that are operated by a motor to either a closed postion (FIGS. 4, 6, 8) thereby securing the tubular workpiece 10 for movement with the carriage 20, or to an open position (FIGS. 5, 7, 9) thereby allowing movement of the tubular workpiece 10 between the grippers 24. A pusher 26, is also mounted on the carriage 20 and is shaped to engage the end of the tubular workpiece 10. In a preferred embodiment, the pusher 26 is mounted on the piston 28 of a solenoid assembly 30 so that the pusher 26 may move axially with respect to the workpiece 10 and be stroked independently of the carriage 20 to eject an unused portion of the tubular workpiece 10.

The carriage 20 includes a sensor so that the position of the pusher 26 with respect to the carriage 20 may be ascertained at at least one point along the reciprocation route of the pusher 26. In a preferred embodiment, this sensor is a contact switch assembly 32 that includes a contact 34 mounted on the back of the pusher 26 that contacts the switch 36 part of the assembly 32. Thus, when the carriage 20 moves forward and the pusher 26 contacts the end of the tubular workpiece 10, further forward movement of the pusher 26 is prevented while the carriage 20 continues forward until the contact 32 contacts the switch 36. As will be discussed in greater detail below, the contact of the contact 32 with the switch 36 signals the grippers 34 to close upon the tubular workpiece 10, thereby advancing the workpiece 10 with the carriage 20.

The advancer, cutter, ejector of the present invention is preferably operated by selecting a tubular workpiece 10 to be cut and positioning the workpiece on the cradle 14 in the base 12 in alignment with the cutting machine (not shown). After the cutting machine is programmed to make cuts at the desired lengths, the machine is activated at the control panel 16. The carriage 20 then begins to travel forward, thereby contacting the pusher 26 with the back end of the tubular workpiece 10. The contact of the pusher 26 with the tubular workpiece 10 causes relative rearward movement of the pusher 26 with respect to the carriage 20 while the carriage 20 continues to move forward. During this time, as shown best in FIG. 5, the grippers 24, in an open position, continue to move with the carriage 20 in a position coaxial with the tubular workpiece 10. Then, after the grippers 24 have traveled a predefined distance down the length of the workpiece 10 whereby they can securely grip and advance the workpiece 10, a sensor, such as a contact switch assembly 32, is activated sending a signal to activate the grippers 24 to grip the tube 10 and stop the pusher 26 from further relative rearward movement with respect to the carriage 20. If a contact switch assembly 32 is used in connection with a solenoid assembly 30, as in the preferred embodiment depicted herein, the switch 36 can act as a "stop" to prevent further relative rearward movement of the pusher 26. However, in other embodiments, it would be possible to have a sensor send a signal to the pusher assembly to prevent further relative rearward movement of the pusher 26. Of course, in any embodiment, the grippers 24 should not be closed until they have passed the pusher 26, and only should be closed once they can securely hold the workpiece 10 for advancing and cutting.

The carriage 20 continues forward, now with the workpiece 10 secured thereto, a designated cutting length and stopped. As discussed above, the movement of the carriage 20 may be controlled in a number of different ways, such as through the use of standard motor and corresponding sensors, hydraulics, etc. Preferably, however, the carriage 20 is moved along the tracks or rails 22 using a stepper motor (not shown) that is precisely controlled by a controller (not shown).

Next, once the tubular workpiece 10 has been positioned to make a cut of the desired length, the cutting machine is activated and the carriage 20 is moved again the designated length and the desired cut is made. This process continues until all of the desired lengths of tube have been cut from the tubular workpiece 10. The controller for the carriage 20, having calculated the number of cuts that have been made, then deactivates the grippers 24, thereby releasing hold of the tubular workpiece 10. The opening of the grippers 24 signals the solenoid assembly 30 to stroke forward, thereby ejecting the remaining piece of the workpiece 10 through the cutting machine. The carriage 20 then cycles back to the rear end of the base 12 and is reset to cut another workpiece 10.

While the form of the apparatus herein described constitutes a preferred embodiment of the invention, it is to be understood that the invention is not limited to this precise form of apparatus, and that changes may be made therein without departing from the scope of the invention.

What is claimed is:

1. A method for advancing and cutting tube blanks into desired lengths and ejecting an unusable piece of tubing comprising the steps of:

selecting an apparatus for cutting a tubular workpiece comprising a cutting apparatus for cutting the tubular workpiece, a base for supporting said cutting apparatus and said tubular workpiece, a carriage mounted for independent movement with respect to said base, grippers attached to said carriage for securely holding said tubular workpiece during a cutting process, a pusher mounted on said carriage for reciprocal movement with respect to said carriage, said pusher being shaped to engage an end of the tubular workpiece, a sensor mounted to said carriage for sensing a location of said pusher with respect to said carriage, and a switch for initiating said cutting process;

selecting a tubular workpiece to be cut and positioning said workpiece on said base in alignment with said cutting apparatus;

initiating said cutting process by activating said switch, said activation causing said carriage to move longitudinally forward with respect to said tubular workpiece toward said cutting apparatus thereby contacting said pusher with an end of said tubular workpiece wherein said contact causes relative rearward movement of said pusher with respect to said carriage for a predetermined distance;

upon said predetermined distance being sensed by said sensor, closing said grippers and securing said tubular workpiece to said carriage;

continuing to alternately move said carriage forward predetermined lengths and activating said cutting apparatus thereby cutting desired lengths of tube from said tubular workpiece;

upon said carriage reaching a predetermined distance from said cutting apparatus wherein no more desired lengths of tube may be cut from said tubular workpiece, said grippers being opened; and upon said opening of said grippers, said pusher stroking forward engaging said end of said tubular workpiece thereby ejecting said tubular workpiece through said cutting apparatus.

2. The method of claim 1 wherein movement and positioning of said carriage is accomplished using a stepper motor.

3. The method of claim 1 wherein reciprocation of said pusher is accomplished using a solenoid.

4. The method of claim 1 wherein said sensor is a contact switch and said contact switch is activated to close said grippers by a contact point on said pusher.

5. The method of claim 1 wherein after said pusher is stroked forward to eject said workpiece, said carriage is automatically moved back to a zero position with respect to said base in order to accept positioning of a tubular workpiece.

6. The method of claim 1 wherein said cutting apparatus is a supported shear type cutting apparatus.

7. The method of claim 1 wherein movement of said carriage is accomplished by a hydraulic motor and positioning of said carriage is accomplished via sensors.

8. The method of claim 1 wherein reciprocation of said pusher is accomplished via a hydraulic piston assembly.

9. The method of claim 1 wherein reciprocation of said pusher is accomplished via a servo motor.

10. The method of claim 1 wherein said sensor is an infrared sensor.

11. The method of claim 1 wherein movement and positioning of said carriage is accomplished by a standard motor in combination with sensors for determining the positioning of said carriage with respect to said base.

\* \* \* \* \*